Nov. 27, 1962     A. V. COLABELLA, JR     3,065,554
THREE-DIMENSIONAL REPRODUCTION APPARATUS
Filed Feb. 20, 1958     3 Sheets-Sheet 1

INVENTOR.
Alfred V. Colabella, Jr.,
BY
Atty's.

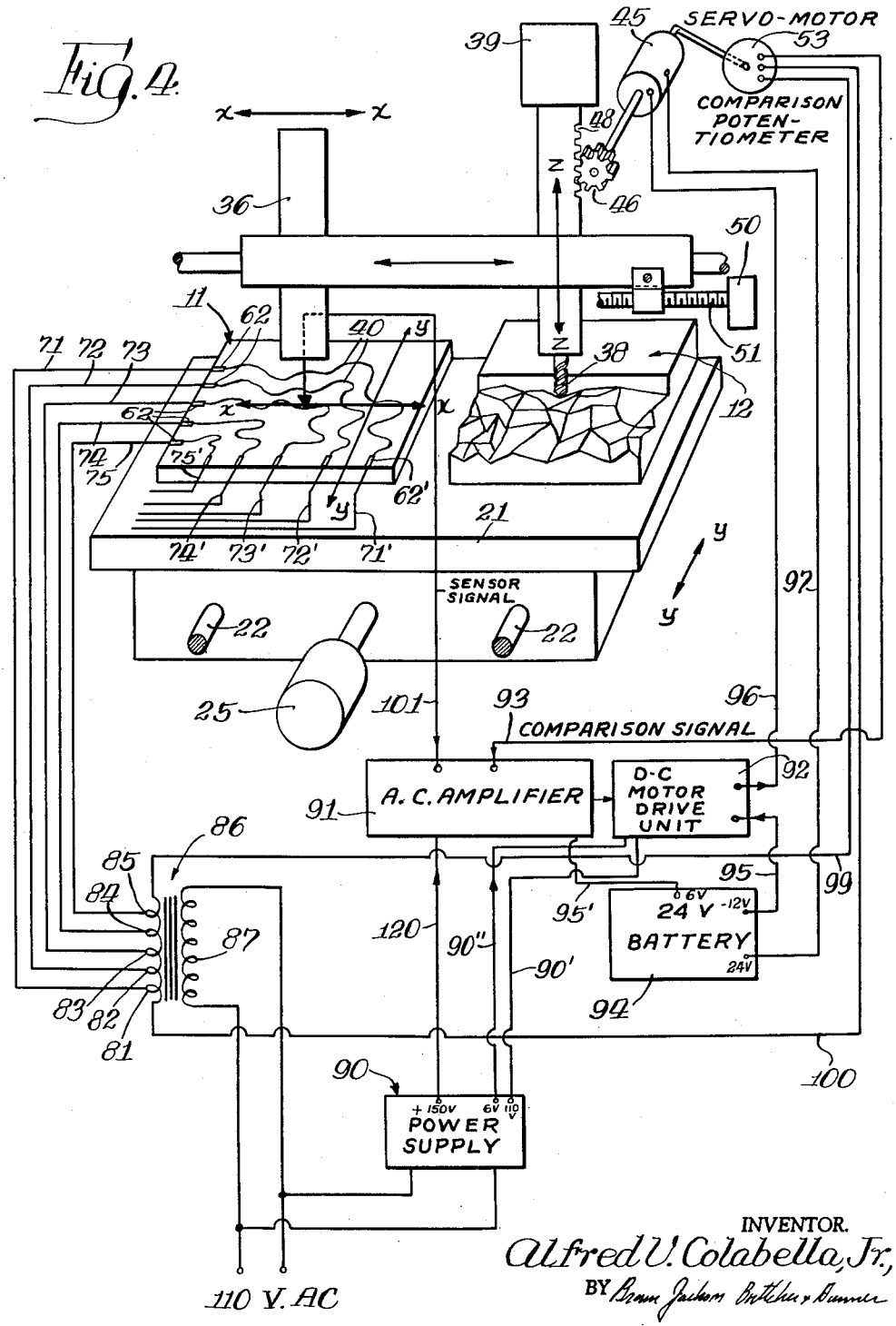

Nov. 27, 1962

A. V. COLABELLA, JR 3,065,554

THREE-DIMENSIONAL REPRODUCTION APPARATUS

Filed Feb. 20, 1958

INVENTOR.
Alfred V. Colabella, Jr.,
BY Brown Jackson Boettcher & Dienner

Attys.

ic contour lines. Thus, in this invention, electrically
United States Patent Office 3,065,554
Patented Nov. 27, 1962

3,065,554
THREE-DIMENSIONAL REPRODUCTION APPARATUS
Alfred V. Colabella, Jr., Bordentown, N.J., assignor, by mesne assignments, to Kaiser Industries Corporation, Oakland, Calif., a corporation of Nevada
Filed Feb. 20, 1958, Ser. No. 716,479
17 Claims. (Cl. 35—41)

This invention concerns means for producing three-dimensional forms by removing material from a solid block so that the remaining material represents the desired three-dimensional surface, and particularly relates to improved apparatus and a novel method for reproducing a three-dimensional relief map from topographical data charted on a two-dimensional map.

For some time there has been a need in the field for an efficient, accurate, and economical means of reproducing a three-dimensional or spatial form from data represented on a two-dimensional surface. This has been especially required in the making of three-dimensional relief maps from topographic data depicted by elevation contour lines on flat map copy. Previous efforts have resulted in topographic models in which various elevation contour lines are machine profiled from sheet material. The resulting elevations represented by the sheet material are stacked by successive elevations and appear as planes or steps corresponding to depicted elevations. It is then left to the ingenuity of craftsmen to carve or fill in the areas between such elevation planes to provide smooth transitions between discrete contour elevations and to simulate features representing the three graphic dimensions of a selected terrain. Usually, this "carving" or "fill-in" is by hand, entailing long and arduous effort. By reason of the detailed nature of this work, topographic models constructed in this or a similar manner are naturally subject to human error, while the effort and time involved makes present procedures uneconomical and too slow.

This invention adopts an underlying concept that spatial form may be represented on a single surface (generally either a plane or spherical surface) without necessarily resorting to multiple view orthographic projection. For example, this may be accomplished by delineating intersections formed by surfaces parallel or concentric to a reference surface. This technique is the basis of elevation representation in contour maps in which lines are drawn through points of like elevation from a reference surface to provide so-called contour or isometric lines. Thus, lines of constant elevation in a contour map represent the loci of points having a constant and common distance from a reference surface, usually mean sea level.

Spatial form may also be represented on a single plane by three mutually perpendicular axes X, Y and Z. The perpendicular projections of all points on the spatial form may then be made to any one of the three mutually perpendicular planes determined by these axes. The length of the perpendicular projections are noted at the points of their respective intersections with the selected plane. Points of equal length or value, when connected, from isometric lines.

Similarly, representation may be made on a spherical surface by using a polar coordinate system. In the polar system, the origin of reference lies in the center of the sphere with the coordinates being drawn to all points on the spatial form. The radial length of these polar coordinates may be noted at the point of their respective intersection with the spherical surface, so that points of equal radial length or value may be connected to form isometric lines.

It would appear, therefore, that lines representing constant physical values, other than length, may be placed on any surface to correspond to values of isometric contour lines. Thus, in this invention, electrically conductive lines have been selected to represent such values. These electrical conductive lines may be placed on a surface by printed-circuit techniques, particularly photo-circuit techniques, and a given electrical quantity assigned to each conductive line. The electrical quantity represented by each line is further proportioned to a selected isometric element value or contour line of a contour map to be spatially represented. Either a direct current voltage, where the voltage value is made proportional to the isometric value, or sinusoidal voltage, where the R.M.S. voltage is made proportional to the isometric value, may be utilized for the selected electrical quantities. To provide interpolation of electrical values between lines of constant or isometric values, the electrically conductive lines are resistively coupled with a material of known uniform resistance, by means of any of several known techniques, to produce a substantially linear relation between selected or adjacent value lines.

While it is conceivable under this advanced technique that isometric lines may intersect, as in a topographical map, such intersection may be avoided when assigning distinct electrical quantities to the conductive lines. Deletion of elevation data lines does not lead to inaccuracy if the horizontal distance increment between such lines is equal. Such modification may be lessened by enlarging the scale of the circuit pattern or template over that of the contour map represented, thus increasing the spacing between adjacent electrical data lines.

The accuracy of practicing this invention, according to the above-outlined principles, is determined in part, at least, by the scale of reduction or amplification used in the reproduced spatial form; such generally being a compromise selected by the spatial information desired, and the extent of a chosen display area. The accuracy and location of isometric lines or lines of electrical constancy is also varied in making the initial contour map and also by the accuracy of the photo-transfer or other techniques employed in depicting the isometric lines of such contour map or the data template of this invention. The accuracy and maintenance of values assigned to the lines of constancy on the template is also a determining factor in the overall reproduction problem. This factor depends largely on the physical quantity used for representing a selected spatial value, plus the means for reading such quantity and converting the information into duplicating activity. Of further importance is the accuracy of interpolating physical values between lines of constant electrical data. This latter factor depends largely on the described form of this invention, upon the degree of uniformity of the resistive coupling or material used in the data template between the electrical data line and the preservation of a selected linear relationship between the physical values existing at any two adjacent data lines.

In brief, the present invention is directed to an improved apparatus for producing any spatial forms, particularly three-dimensional relief maps from topographic data represented on printed contour maps. The successful adaptation of this invention to the map-making art lies largely in providing an improved two-dimensional reference template in which selected topographic data is reproduced in the form of electrically conductive elevation data lines. Under this process each elevation or electrical conductive data line for which a corresponding isometric line of contour data is available from a contour map, is assigned a constant electrical voltage; the value of the voltages being related to the elevation represented thereby. Correspondingly valued voltage lines are connected by wires or similar "patching" methods.

A uniform coating of a semi-conductive substance extends between the conductive lines to provide a convenient means, when the template is suitably energized, for interpolating voltages and corresponding elevations existing at selected points between the lines which bear the constant assigned voltages depicting given elevations.

In this manner a resulting pattern of electrical potential is produced over the template board which corresponds directly with the elevation data of the original printed topographical map. Such energized template is then suitably scanned by a voltage sensitive probe, and the voltages sensed by the probe utilized to operate a servo-system which automatically controls the cutting depth of a machine tool or sculpturing cutter in forming a three-dimensional duplicate from a suitable carving blank. In conjunction with such elevational movement, suitable synchronization of the probe and cutter is maintained to move the cutter. The resulting three-dimensional form constitutes a desired relief duplicate which may be used as an end product or a die for reproducing, by any number of standard and known methods, additional duplicate three-dimensional forms.

While the invention set out herein is related to the production and making of three-dimensional relief map molds such is not necessarily restricted to that purpose or the use of electrical voltage as the significant medium for depicting elevation or other spatial information. A number of other electrical quantities may be used with equal advantage for this purpose, such as phase relationships in a periodically varying or alternating electrical current system. Other media, such as light, magnetism, or radio activity, may also be employed within the contemplated scope of the present invention.

It is, therefore, the main object of this invention to provide a new and improved apparatus and method for providing three-dimensional forms.

Another object of this invention is to provide an apparatus, as aforesaid, in which spatial form is reproduced in response to electrical detection and dissemination of spatial data represented on a two-dimension reference template.

A further object of this invention is to provide a new and improved apparatus for producing three-dimensional representations of a terrestrial area, or the like, by means responsive to an electrical pattern of the graphical contour involved. Such apparatus may include an electrical memory member which is operative to control a trace or probe device in the provision of a three-dimensional form from data stored on the memory member.

An additional object of this invention is to provide a contour forming device in which a sculpturing tool and a forming blank are relatively actuated along three axes of movement to depict three-dimensional form in response to the detection of predetermined electrical quantities protraying variations in physical shape indicative of at least one dimension of the reproduction desired.

A still further object of this invention is to provide an improved means for depicting selected dimensional data with electrical quantities on a reference template and according to a preselected pattern.

Still another object of this invention is to provide an improved means for depicting data on an energized electrical conductor, according to a given three-dimensional pattern and transferring such data directly into a three-dimensional reproduction thereof.

A still further object of this invention is to provide a new and improved means for producing three-dimensional relief maps from a printed contour map.

Another important object of this invention is to provide a new and improved pattern in which three-dimensional topographical information, for example, is depicted in part, by electrical quantities capable of being detected and measured to energize and motivate suitable sculpturing means for producing a three-dimensional representation of such topographical information.

The above and further objects, features, and advantages of this invention will appear to those familiar in the art from the following detailed description of a preferred embodiment thereof, as illustrated in the accompanying drawings.

In the drawings:

FIGURE 4 is a schematic representation of a servo operating system employed in the machine of FIGURE 1; and FIGURE 5 is a diagram of a typical electrical circuit employed for operating the system of FIGURE 4.

Figure 1:
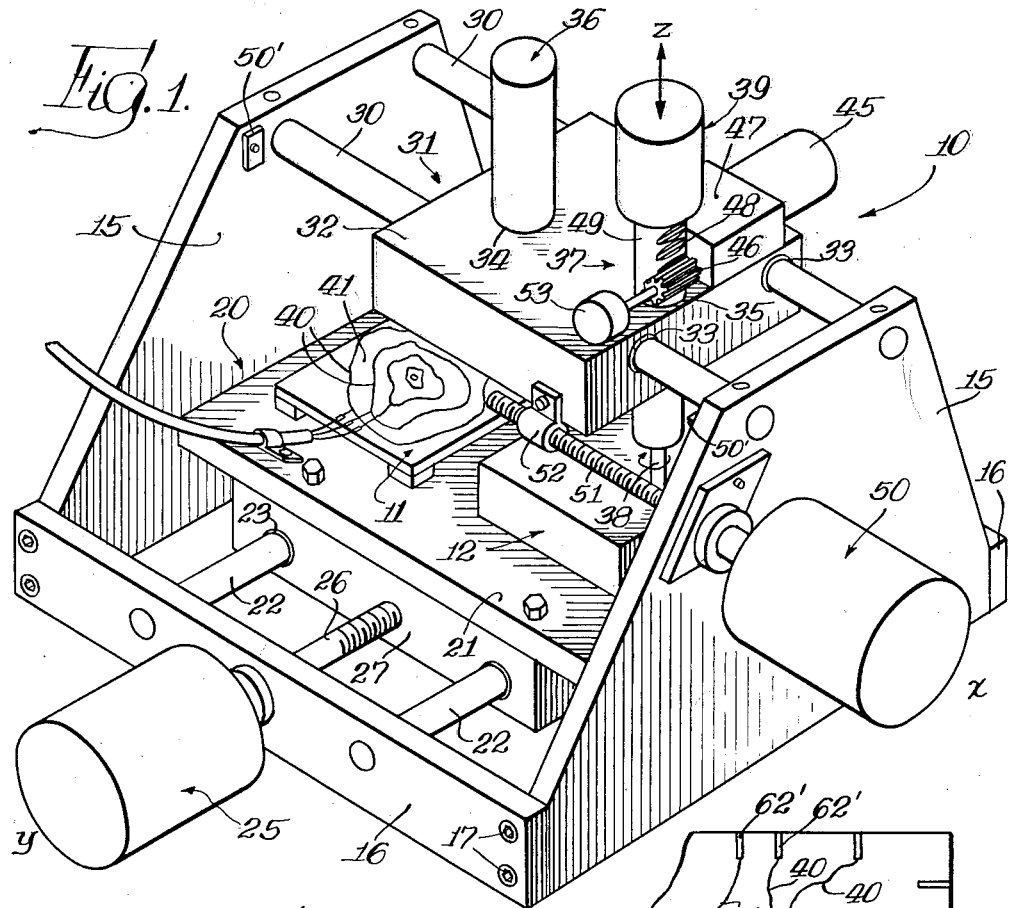
FIGURE 1 is a perspective showing of one form of apparatus capable of performing and producing a three-dimensional model in accordance with the concepts of this invention.

Turning now to the drawings, and particularly FIGURES 1–4 therein, a reproducing machine 10 is shown which cooperates with a two-dimensional template 11 and a blank or carving block 12 to form a three-dimensional model according to the data of template 11.

To successfully carry out the concepts and principles, hereinabove outlined and attributed to the present invention, it is essential to associate a master data template 11 with a block 12 to be carved by machine 10, according to the data depicted on the template.

In brief, machine 10 includes a support base, comprising a pair of parallel spaced trapezoidal-shaped end plates 15, 15 which are suitably joined and held apart adjacent their lower ends by intervening side plates 16, 16. Cap screws 17, 17, or like fastening devices, may be employed, as desired, to rigidly fix the side plates 16 to and between the end plates 15, thereby forming a rigid quadrangle support structure.

A table means 20, which includes a planar supporting top member 21, is disposed within the limits bounded by the base structure and is supported thereon for horizontal movement along a pair of parallel spaced slide rails 22, 22, herein shown as cylindrical rods connected at their ends to the side plates 16, 16. Bushings 23, 23 provide bearing surfaces for the sliding movement of the table means on rails 22. A conventional rotary stepping device 25 which as energized advances the drive shaft through a preset angular distance is employed to drive a lead screw means 26 having threading engagement with the base portion 27 of the table assembly 20. Thus, upon suitable energization of rotary stepper 25, the table assembly will be moved along the rails 22, 22, in accordance with the direction of rotation imparted to the lead screw means 26. Such movement of the table assembly is in a horizontal plane and defines or depicts dimension along a Y—Y axis of spatial definition, as discussed above and shown in FIGURES 1 and 4.

Mounted on the upper face of the table top 21 is the master pattern template 11 (to be described in greater detail presently) and the carving blank 12 which is to be sculptured according to the topographical data depicted on template 11. Both the template 11 and block 12 are fixed in designated positions on the table top 12 by any suitable clamping or attaching means for conjoint movement therewith and thereby in fixed relation with each other.

Disposed over the table assembly 20 and movable along an axis X—X transverse to axis Y—Y and in a parallel plane as defined by parallel rails 30, 30 which extend between the upper ends of the end plates 15, 15, is a travel head assembly 31. The head assembly 31, as shown, comprises a large substantially rectangular metal block 32 of aluminum or other light rigid substance having suitable openings for the close fitting reception and passage of the horizontal guide rails 30, 30. Bushings 33, 33 carried by block 32 surround rails 30 and provide a desired bearing support. Block 32 also is formed with a pair of enlarged laterally spaced openings or sockets 34 and 35 for the reception, respectively, of a scanning probe 36 and a sculpturing instrumentality or means 37.

The scanning probe 36, in the embodiment herein shown, is to pass over and detect the topographical data depicted by line 40 of selected constant potential and intervening resistance areas 41 of the master template 11. Therefore, probe 36 preferably comprises means sensitive to voltage variation, such as a very high impedance sensing probe, as will be further described in conjunction with the detailed description of the master template means 11.

The sculpturing means 37, as depicted in FIGURE 1, may comprise a milling cutter 38 rotatably driven on a vertical axis by an air or electric motor means 39 and movable vertically along an axis Z—Z relative to the model blank 12. For this latter purpose, a servo motor 45 responsive to the signals of the sensing probe 36 is connected to drive a pinion member 46 through a gear reducer 47. Pinion 46 works with a gear rack 48 formed on a movable body 49 of the sculpturing device 37 to thereby elevate or depress the cutter 38, according to the signal detected from template 11 and transmitted by probe 36.

Movement of both the sensing probe 36 and the sculpturing device 37 back and forth along the X—X axis is accomplished conveniently by means of drive motor 50 which rotates a lead screw means 51 at constant speed, the same being engaged with a follow nut 52 fixed to the travel head 32. Limit switches 50' (FIG. 1) are operative to reverse the direction of rotation of the X drive motor 50 at the end of each trace along the X axis and simultaneously energize the pulse rotary stepper 25 to advance the table 20 a predetermined increment along the Y axis so that a new trace is effected as the drive motor now returns the cutter 38 across the block 12. A comparison potentiometer 53 is also provided to properly synchronize motor 45 with the sweeping operation and signals of the probe 36.

It will be understood, therefore, that the master template 11 and the block 12 to be carved in three-dimensions move together along a single axis Y—Y, as defined by the guide rails 22, 22 while both the sensing probe 36 and the sculpturing device 37 travel along a second axis X—X (transverse to axis Y—Y) in response to energization of motor means 50. Such described movement along the axis Y—Y is intermittent at the end of each sweep of the probe in order to position the probe over an unswept area of the template. Sweeping movement of the probe and sculpturing device along axis X—X is simultaneous and at a constant velocity, sequential with the periodic infeed operation of rotary stepper 25 and resulting movement of the table along axis Y—Y. Additionally, the sculpturing device moves vertically along a third axis Z—Z, which is related at right angles to both axes X—X and Y—Y. Such movement is determined by the energization and movement imparted thereto from the synchro motor means 45 in response to the elevation information depicted on the template 11 and detected by probe 36. Energization and operation of the drive motor 39 to rotate the cutter 38 is preferably constant to carve or sculpture the block 12. In this respect, motor 39 may comprise an air or an electrically energized motor, operable independently or synchronized with the feed motors 25, 45, and 50.

While operation of the several motors 25, 45, and 50 is preferably automatic and in timed synchronism with the sweeping movement of probe 36, both feed motors 25 and 50 may be energized by suitable manually operated switch or relay systems, if desired. It is necessary, however, that the servo motor 45 which determines the vertical feeding movement of the sculpturing cutter 38 remain synchronized to the output signal of the detecting probe 36, so that as the latter detects variation in the electrical elevation quantities represented by and between assigned constant voltage lines 40 on the template 11, such information may automatically appear in the up-and-down movement of the sculpturing instrument 37.

Figure 2:
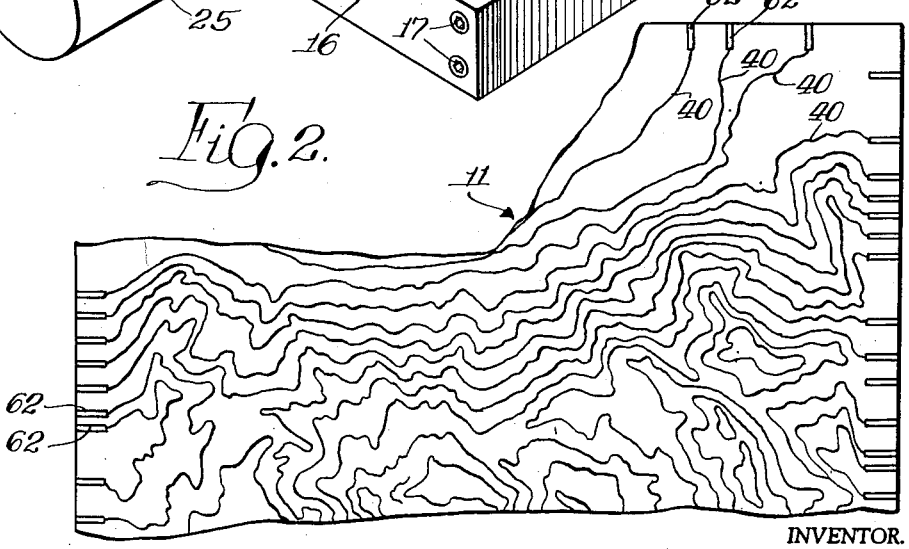
FIGURE 2 is a partial enlarged plan view of a typical contour pattern of topographic information employed in map making with the machine of FIGURE 1.
Figure 3:
FIGURE 3 is a partial cross-sectional view of the pattern means illustrated in FIGURE 2.

Turning now to the features and details of the master template means 11 on which the topographical information is depicted, reference is made to FIGURES 2 and 3 of the drawings. As previously discussed, it is desirable that all points on the surface of template 11 depict, by a selected electrical quantity, a value which is directly proportional to corresponding points of spatial form representation. In the present system, the spatial form is described by three mutually transverse coordinates X, Y, and Z, of which two are length coordinates and a third represents a physical elevation quantity coordinate. The magnitude of the third coordinate is determined by the value of the related physical quantity depicted thereby on the template 11 and, in the herein illustrated case, such determines the position of the lower end of the sculpturing cutter 37 along the axis Z—Z relative to a selected zero or reference plane.

In constructing a template such as that shown herein, an area to be reproduced from a typical contour map is chosen, and a replica of the basic contour line data of the contour map is formed at a desired scale on a plate of thin copper bonded to a base 61 of insulating material, such as phenolic resin, or a moderately conductive material. The contour line replica may be conveniently produced by a number of known processes typical of those highly developed recently for manufacturing printed electronic circuit boards. By such processes, photographic means are used to transfer the original printed material of the contour map to the specially prepared chemically coated, copper clad phenol sheet. Chemical etching is then used to form the photographed pattern in the copper. This results in a template pattern in which the conductive lines 40 appear in relief and corresponding to selected isometric elevation lines of the original contour map.

With respect to the pattern and the proportions of the template 11 relative to those of the original contour map, it has been found preferable in certain embodiments requiring a more exacting definition, to increase the scale of the template 11 by substantially a ratio of 4 to 1 over that of the original contour map. This provides good spacing between adjacent electrically conductive lines 40 and makes for better interpolation of the areas therebetween.

Each of the resulting conductive lines of the pattern template is then assigned a given proportionate electrical value which in the particular embodiment herein described constitutes a voltage value which is directly proportional to the topographic elevation which it represents. Separate lines of the same elevation are manually interconnected by special "patch cord" electrical connecting devices (not shown) or a similar means. The sets of lines corresponding to a given elevation are then ready for connection to a source of the assigned direct current voltage. In order to assist such interconnection of the various lines 40, to a source of assigned voltage, template 11 is provided with a series of enlarged contact areas or fingers 62 and 62' adjacent the periphery of the template at the terminal ends of the lines 40, 40 and with which adequate circuit connection is made.

The resulting template is then coated with a homogeneous semi-conductive film of resistance material 63 having a carefully determined resistance coefficient to provide a proper compromise between power demand and field pattern distortions resulting from input impedance of the sensing probe. The required conductivity of the film 63 is best obtained by utilizing a homogeneous material as, for example, carbon black or graphite carried in a resin solvent and suitably chosen to produce a desired value of resistance. A coating .055 gram per square inch having a ratio of resin to graphite of 1 to 5 will produce a resistivity of approximately 800 ohms per square inch which appears satisfactory in operation, although the ratios and ingredients for such a resistance coating may obviously be changed and varied according to the results desired. The resistive mixture may be best applied in a machine which traverses the template back and forth horizontally at constant velocity while a spray gun applies the resistive formulation to produce an even coating of the desired thickness. When the coating 63 has been applied, the entire template is cured in an oven and air-dried at approximately 150° C.

The technique of so separating the lines of constancy 40 by semi-conductive material 63 of preselected and known resistance provides a convenient means for interpolating the voltage existing at any point between a selected pair of adjacent contour lines as the template 11 is scanned by the voltage sensitive probe 36. Thus voltage detected at any point on the template is directly proportional to a given reference altitude or elevation along the Z—Z azis. In providing the semi-conductive resistance coating 63, roughness of the surface and non-uniformity thereof are to be avoided. To that end, the texture of the surface should be maintained smooth and display a homogenous character throughout.

While the foregoing description has reference to a template or board 11 which is coated with a homogenous semi-conductive film and wherein the film is carefully chosen to have a selected resistance coefficient providing a proper compromise between power consumption of the template and field pattern distortion resulting from input impedance of the sensing mechanism, such is only indicative of a general technique for producing a template of this character. Other methods will be readily apparent to parties skilled in the art. Required conductivity of the template is also controllable, for example, by using a homogeneous material of known conductivity as a backing material for the basic copper coating, in place of the phenolic base 61, illustrated in FIGURE 3. In a similar manner, the resistive coating 63 may be "built-up" on the surface of the template to provide a smoother contact surface.

Since the assigned voltage sources are connected to the template in operation, a field of electronic potentials will be produced on the surface of this alternate template structure corresponding exactly to variations in topography depicted by the original contour lines printed on the graphic chart and converted to the template.

Use and Operation

In considering the operational sequence involved in the making of a three-dimensional relief map with a machine, such as that set forth in FIGURE 1 and schematically represented in FIGURE 4, it is well to note that the master block 12, from which the three-dimensional model is to be sculptured, may be made from a wide variety of materials without deviating from the basic invention. Materials considered usable for this purpose include metallic alloys, wood, thermoplastics, including waxes (particularly recording waxes used in the recording industry) thermo-setting materials, cellular materials (such as cellulose acetates) Styrofoam, and self-foaming materials, such as Lockfoam, and others to mention a few.

In the machine 10, the scanning probe 36 and the cutting or sculpturing element 37 are synchronized in their movements, so that the motion of the sculpturing element along axes X—X and Y—Y over block 12 is according to the movement of the scanning probe along the same axes and over the electrically energized template 11. The simple expedient employed for insuring this synchronized relationship in the illustrated example constitutes the block 32 which supports both the scanner and sculpturing tool in a fixed spaced relation. This may also be accomplished by relating the scanning and sculpturing instrument in slavery by servo systems or mechanical linkages of which a pantograph is a typical example. Alternately, the probe and cutting tool may be fixed in space relation and held stationary while the energized template 11 and master block 12 are moved in a regulated scanning pattren relative thereto. Required scanning motion is then imparted laterally and longitudinally to the table which supports the template and master block to achieve the desired relationship and synchronization of movements along the X—X and Y—Y axes. It is also possible to impart movement along the Y—Y axis to the head 31, while imparting movement along the X—X axis to table 20 which carries the template 11 and block 12. The scanning and cutting pattern may be irregular and randomly selected by operator or alternatively by a predetermined regular scan pattern. These alternate modifications of the apparatus 10 are mentioned herein to demonstrate its versatility and obvious adaption to change, as will appear to those skilled in the art. Bascially, however, all such described modifications provide necessary relative movement along the X, Y and Z axes according to the intents and purposes of the present invention.

With particular reference now to FIGURE 4, it will be appreciated that the synchronized relation between the scanning device or probe 36 and the milling tool 38 is therein typified. Under this system, the voltage elevation lines 40, 40 are formed on template 11 which is then fixed to the upper side of the table 20 in spaced relation to bloc 12, likewise fixed to table 20. A plurality of patch conductors 71, 72, 73, 74, 75, etc. are joined each to a conductive finger 62 at one edge of the template 11 thereby to connect with one end of a related line 40 of electrical constancy. Another set of conductors 71'–75', which form respective pairs with conductors 71–75, are mated, etc., electrically connected to patch terminals 62' at the respective ends of the various contour lines of constancy 40, and such paired conductors are joined together at suitable junction points. The lines of constancy are then connected to a source of assigned electrical potential, as by joining their related conductors 71–75 to corresponding turns 81–85, respectively, of the secondary winding of transformer 86 as indicated in this particular case where elevation increments are represented by equal voltage increments. In arrangements in which the lines representative of a particular elevation are not extended to the edge of the template, pins may be extended through the template to the underside thereof to permit connection of the appropriate voltage value thereto. Primary winding 87 of the transformer is supplied from a 110-volt A.C. power source, as shown.

With this arrangement, a preselected voltage value is assigned and provided for each of the several lines of constancy 40, 40 in proportion to its designated quantity or, in this illustrated instance, its vertical height above a mean sea level or other reference surface.

With template 11 energized, synchronization of the probe signal and the vertical feed of the cutter 38 along the Z—Z axis is required. This synchronization is necessary to assure responsive operation of the vertical positioning of the milling cutter 38, according to the elevational data detected by the probe 36, as the latter scans or sweeps across the template 11.

To this end, a power supply unit 90 (FIG. 4), is fed from a 110 volt A.C. power source, and provides 150 volts D.C. potential for the tube plates of the amplifier 91; and 6 volt and 110 volt A.C. potentials for the motor drive unit. A power source 94, which may comprise a 24 volt battery, provides six volt potential for the tube filaments in the amplifier 91; 12 volt biasing potential for the screens of the tubes in the D.C. motor drive unit 92; and 24 volt potential for the servo motor 45.

The signal pickup of the scanning probe as the latter sweeps along axis X—X is coupled over conductor 101 to one of the input terminals for the amplifier 91. A comparison potentiometer unit 53 which is mechanically linked to the shaft of the servo motor unit 45, and electrically coupled to the secondary winding of the transformer 86 by conductors 99 and 100, provides signals representative of the cutter head position over conductor 93 to the second input terminal of the amplifier unit 91. As shown in more detail hereinafter, the sensor signal output on conductor 101 is referenced to the output of the comparison potentiometer 53 prior to coupling to the first stage of amplifier unit 91 for the purpose of indicating the direction and extent of operation of the servo motor required to position the sensor head at the proper point on the Z axis. The resultant output signal of amplifier unit 91 is coupled to the D.C. motor drive units which in turn couples the operating signals over output conductor 96 to the servo motor 45. Servo motor 45 in its operation positions the cutter head 38 along the Z—Z axis and simultaneously adjusts the comparison potentiometer 53 to transmit to amplifier 91 a signal indicative of its position. As the output signal of the comparison potentiometer 53 and the sensor signal on conductor 101 read a predetermined relative value, the output of the D.C. motor drive unit 92 is terminated and the cutter head is in the position desired.

With reference to the circuitry of FIGURE 5, the specific components of the A.C. amplifier unit 91 and motor drive unit 92 are shown in more detail thereat. As thereshown, the sensor signal and comparison signal are coupled over conductors 93 and 101 to the input circuit of the amplifier 91 which includes the primary winding of a signal transformer 105, the secondary of which is connected to the input circuit of the first amplifying stage 106 of amplifier unit 91.

The amplifier unit 91, as illustrated, comprises essentially three stages. The first and second input stages may include a conventional twin triode vacuum tube having dual or twin sections 106 and 107 which constitute first and second amplification sections. Tube section 106 includes cathode 108, grid 109, and anode designated 110, and tube section 107 includes corresponding elements 111, 112 and 113, respectively.

Cathodes 108 and 111 are joined to a ground bus 115 through cathode resistances 116 and 117, respectively. In this latter respect, cathode resistance 116 may be in the order of 300 ohms, while resistance 117 is in the order of 680 ohms. Bus 115 is connected to ground by conductor 118. Anodes 110 and 113 are energized over input conductor 120 with a 150 B+ plate voltage by the power supply unit 90, the potential being coupled to the plates 110, 113, and 138 over conventional decoupling networks comprised of resistors 121 and 121', which are in the order of 22K each, load resistances 122 and 122' in the order of 100K each, and capacitors 124, 124', 125 and 125', about .01 μf. each are also connected in the circuit as shown.

The input circuit for the grid 109 of the first stage including tube 106 is supplied from the secondary of transformer 105, and includes a 470K grid resistor 126 coupled to ground. The anode output of tube section 106 couples the output signals over coupling capacitor 130, about .01 μf., to the grid of tube section 107 which is connected to ground through a 470K grid resistor 131.

The output signal of tube section 107, in turn is fed to the output stage including amplifier tube 135 having a cathode 136, grid 137, and anode 138. The cathode 136 of tube 135 is coupled to the ground bus 115 through a 680 ohm resistor 139, and the anode 138 is connected to the B+ rail by a 100K load resistor 140.

The grid input circuit for tube 135 includes a 470K grid resistance 141 and a coupling capacitor 142, .01 μf., coupled between the output side of the amplifier tube 107 and the grid of tube 135.

In addition to the amplifier stages, as hereinabove described, amplifier unit 91 also includes an RC network 145 comprising a variable 100K resistance 146 and .1 μf. capacitor 147 connected across the plate 138 and cathode 139 of the final stage of amplifier 91. The filaments 106', 107', 138' of the amplifier tubes are energized by six volt D.C. potential which is coupled thereto over conductor 95' from power source 94.

The RC network 145 couples the output side of the amplifier 91 to the motor drive unit 92 to control same in the provision of motor drive signals over output conductor 96 to the servo motor 45, the nature of which varies in accordance with the value and phase of the input signals coupled thereto by amplifier 91. Motor drive unit 92 basically comprises a pair of tubes 150, 151, (available as 2050 tubes) connected out of phase with one another.

Tube 150 includes an anode 152, a screen 153, a grid 154, and a cathode 155, while tube 151 contains corresponding elements numbered 156–159. Filament heaters for tubes 150 and 151 are supplied over conductor 90" with six volt A.C. potential by power source 90. The plates of the tubes 150 and 151 are connected out of phase and supplied with 220 volts by power transformer 160 having primary winding 162 and secondary windings 163 and 164, respectively. The primary 162 of transformer 160 is coupled over conductors 90' to the 110 v. output terminals of power source 90; transformer secondary winding 163 is connected between the plate 152 of tube 150 and the cathode 159 of tube 151, plate load resistor 165 being connected in series therewith; and transformer winding 164 is connected between the plate 156 of tube 151 and the cathode 155 of tube 150, plate load resistor 165' being connected in series therewith. Screens 153 and 157 are commonly energized over conductor 95 by negative 12-volt bias potential from battery 94.

The output signal of the amplifier 91 is coupled over the adjustable resistor 146 and a voltage divider 166, to the grid-cathode circuit of the paired tubes 150, 151. The output of the motor drive unit 92 is coupled over conductors 96a, 96b to the servo motor 45.

In operation, the output signal of the sensor probe 36 is coupled over conductor 101 to one terminal of the primary winding 104 of transformer 105, the value of the potential signal being determined by the value of the voltage line on the template, such as on one line 40, with which the probe is in contact. The comparison potentiometer 53 provides a reference signal over conductor 93 to the second terminal on transformer primary winding 104, which signal is indicative of the relative position of the cutting head along axis Z—Z.

Assume (for exemplary purposes) that the comparison potentiometer provides a range of signals of from 0–10 volts in its movement between its extreme positions along the Z—Z axis, and that the voltages applied to the template lines vary between 0–10 volts for the different lines in the altitude range of 0–10,000 feet. Assume now that the head 38 is at a position on the Z—Z axis at which an elevation of 5,000 feet is cut in the block (the output signal of comparison potentiometer 53 being 5 volts), and that the sensor is in contact with an altitude line of 5,000 feet (5 volts). Ostensibly, the resultant value of the two signals as applied to amplifier 91 is zero, and the cutter head is maintained in its position on the Z—Z axis.

Assuming now that the sensor 36 is moved across the template and detects a contour having a sharply decreasing slope in the direction of 3,000 ft., the sensor signal input coupled over conductor 101 to the amplifier 91 will decrease in successive increments relative to the reference signal output of the comparison potentiometer 53 (which is at the 5,000 ft. position on the Z—Z axis and is providing a 5 volt signal).

The sensor signal, in the present example, is of a smaller value than the reference signal, and the differential is amplified, and applied to a D.C. motor drive unit 92 to control same to adjust the cutter head to effect a deeper cut in the master block (i.e., a lower altitude).

For purposes of explanation, the differential signal resulting whenever the sensor signal is of a smaller value than the reference signal is identified as a negative signal and a differential signal in which the sensor signal is larger than the reference signal is identified at a positive signal. It will be apparent that with the application of a reference signal over conductor 93 to one terminal of the primary winding 104 and the application of a signal of a larger value by the sensor 36 over the winding 101 to the second terminal of the primary winding 104, the current will flow through the primary winding in a first direction to provide in the secondary winding a "positive" signal of a value which is related to the difference in value of the applied signals and which is of a first phase relative to the energizing current of the power source.

As the sensor 36 applies a signal over conductor 101 which is of a smaller value than the reference signal 93, the current flow thrugh the primary winding 104 will be in the opposite direction, and a "negative" signal of a second phase (180° out of phase with the "positive" signals) is induced in the secondary winding of the transformer 105. As before, the value of the induced signal is related to the difference in value of the applied sensor signal and comparison signal.

That is, if the slope of the contour, as represented on the template, increases sharply toward an altitude of 8,000 feet and the sensor 36 as a result of its movement over the template feeds a signal to the amplifier unit 91 which increases progressively from 5 volts (5,000 feet) in the direction of 8 volts (8,000 feet) with successive incremental movements of the probe, a corresponding differential in the value of the signal output of the sensor and the comparison potentiometer is coupled to the transformer primary 104, the sensor signal being of a larger value than the reference signal and being therefore a positive signal. Such signal is amplified by amplifier 91 and coupled to the D.C. motor drive unit 92 which controls the sensor motor 45 in the adjustment of the cutting head 38 to a relatively higher position on the Z—Z axis, and specifically to the successive points at which the comparison potentiometer provides output signals which correspond to the signals detected by sensor device.

Thus with each change in the value of the signal applied, as now shown, the value of the resultant signal determines the relative amount of adjustment of the cutting head effected by the motor drive unit 92, and the polarity of the resultant signal determines the direction of the adjustment effected. It will be first apparent that since the plate voltage of one tube is 180° out of phase with the plate voltage of the other tube, the application of an input signal of a given phase relative to the 110 v. A.C. line to the grid-cathode circuit of tubes 151 and 152, will bias only one of the aforementioned tubes 151 and 152 to conductivity.

Assuming that the differential voltage across the secondary of the transformer 105 is of such a phase that, after being amplified by the A.C. amplifier 91, it is positive during the period of application of the positive half-cycle to the plate 152 of tube 150, tube 150 will conduct. Since plate 156 of tube 151 is driven negative during such period by the transformer winding 165, tube 151 does not conduct. As tube 150 conducts, and tube 151 is non-conductive, conductor 96a is positive relative to conductor 96a, and the current flow is effected through servo motor 45 to control same to operate in the proper direction to adjust the rotating milling cutting 38 to a higher relative position on the Z—Z axis, the resultant position being consistent with the value of the elevation corresponding to the signal detected from template 11 by probe 36. On the next half-cycle the voltage on both grids 154 and 158 will be negative, and neither tube 150 nor tube 151 will conduct leaving motor 45 to coast until a subsequent half-cycle when tube 150 again conducts. Such operation continues until the resultant signal input of the probe 38 and the servo motor potentiometer 53 are equal. At such time the output of the amplifier 91 is zero, the control signal to the motor drive unit 92, and the output signal over conductor 96a is terminated. The cuting head remains at such position on the Z—Z axis.

Assuming that the probe is now moved to a successive point on the template, and that the input signal across the secondary of transformer 105 after comparison had been of the opposite phase (identified for convenience as a negative signal), as the grid and plate of tube 151 are driven positive during a particular one of the half cycles, tube 151 will conduct and tube 150 will not conduct. As tube 151 conducts, and tube 150 is cut off, conductor 96b becomes positive relative to conductor 96a, and the current flows through the armature of motor 45 in a direction opposite to that described above, so that the motor rotates in the opposite direction (i.e., to move the cutting head 38 downwardly along the axis Z—Z). On the next half cycle, both grids are negative and neither tube conducts. As servo motor 45 rotates to move the cutting head 38 downwardly in this manner, the reference signal obtained from potentiometer 53 is adjusted in the direction of the voltage obtained from template 11 by probe 36, and as the aforementioned resultant voltage across the secondary of transformer 105 is thus reduced to zero, the output motor drive circuit 92 will be reduced to zero, and servo motor 45 will be brought to rest. The rotating milling cutter will then have been positioned properly to depict the elevation corresponding to the signal obtained from template 11 by probe 36.

In this manner, the signal output of the scanning probe 36, as fed to the A.C. amplifier 91 over the circuit conductor 101 is, after comparison with the position indicating signal from potentiometer 53, amplified to drive the servo motor 45 with appropriate direction and duration to suitably dispose the rotating milling cutter 38 in proper position to depict the elevation corresponding to the voltage detected from template 11. With periodic infeeding of the probe and milling cutter, relative to the template and carving block through movement of table 20 along the axis Y—Y accompanied by the constant velocity scanning movement of the probe and cutter along aixs X—X and vertical actuation of the milling cutter 38 along axis Z—Z according to the detected elevation data depicted by the constant voltage lines 40, a three dimensional master spatial form is produced from the block 12 as seen in FIG. 4

*Conclusion*

The novel apparatus and method above described has made possible the preparation of a surface which possesses at any and all points thereon, a physical quantity whose value is directly proportional to the length value of a corresponding point of representation of any spatial form on that same surface. Such representation is, in effect, a representation of spatial form by three coordinates. Two of these coordinates are length coordinates and the third is a physical quantity coordinate, other than length. The magnitude of the third coordinate is determined by the value of the physical quantity.

Spatial form information presented in this manner is highly adaptable for use in controlling automatic devices. Heretofore, in cases where it has been desired to have an automatic device follow cyclic patterns defined by a spatial form of where it has been desired to reproduce articles possessing a defined spatial form, it was generally necessary to contend with extensive preparation to get the desired information in a form utilizable by the automatic device. The spatial form, for example, would have to be either mathematically defined or defined by an actual model. If the defining information were mathematical, a value translation to binary or analogue form was necessarily made and the resulting programming, even with the aid of electronic computing devices at times became exceedingly time-consuming, particularly, if the spatial form is complex. On the other hand, if the spatial form is defined by a model, the preparation time is appreciable, but moreover, the loss of precision in tracing a model is perhaps the greater disadvantage. The apparatus and method set forth in the present disclosure for the presentation of terrain information to an automatic device vastly reduces the preparation or programming time with practically no sacrifice in precision.

The voltage or phase information as assimilated from the spatial form representative surface, by a transducer or a pick-up device, may be fed to a control servo for automatic operation of machine tools, controlling devices, etc. as described herein, or alternatively may be used to control a light source to record the spatial form information on film, or to modulate a carrier signal in the recording of the spatial form information on magnetic tape, or if desired, to control a transmitter device in the transmission of the information to remote locations. The scanning motion in the latter arrangement would, of course, have to be synchronized with the automatic device thus controlled, and if the information is recorded or transmitted, synchronizing information must be included with the spatial form information. Recording of the spatial form information on tape or film or for transmission presents the obvious advantage wherein only one facility is required for preparation of the spatial representative surfaces.

Although the sculpturing means disclosed herein are comprised of a rotating milling tool, it will be obvious to parties skilled in the art that other sculpturing tools may be readily controlled in a similar manner. By way of example, such means may include a heated (or otherwise) chisel cutter; ultra-sonic reciprocating plunger; cutter or abrasive device actuated by magnetostrictive or other means; a thermal probe or plunger for decomposing the undesirable material; a reciprocal cutting or abrasive device; a saw blade; or any other type of sculpturing means which is known in the art.

From the foregoing, it is believed that those familiar with the art will readily understand and appreciate the advancements of the present invention and recognize the meritorious features therein which permits the automatic interpolation of dimensional data depicted by selected electrical quantities, as hereinabove related. It will be appreciated further that numerous changes, modifications and substitutions of equivalents may be made in the specific mechanisms and electrical circuitry shown and described without necessarily departing from the spirit and scope of the invention. As a consequence, it is not intended that the present invention be limited by the details of the hereinabove described embodiment of its features, except as may appear in the following appended claims.

I claim:

1. Apparatus for producing three-dimensional forms comprising, two-dimensional analogue means having spatial data of a third dimension depicted by electrical quantities thereon, the magnitude of the third dimension being indicated by the value of said electrical quantity, electrical detector means for sensing said electrical quantities, the signal output of said electrical detector means varying in accordance with the value of the electric quantity it senses, and reproducing means including sculpturing means operatively controlled in its movement in said third dimension by the varying signal output of said electrical detector means to reproduce in a three-dimensional form the data represented by said analogue means.

2. Apparatus for producing three-dimensional forms comprising, analogue means having spatial data of various values depicted by electrical quantities thereon, the magnitude of said spatial data being indicated by the value of said electrical quantities, electrical detector means including an electrical sensor device, control means for controlling related movement of said sensor device and said analogue means to thereby effect detection of said electrical quantities at different points on said analogue means by said sensor device, the signal output of said electrical detector means varying with the value of the electrical quantity it senses, and reproducing means including sculpturing means operatively controlled by the signal output of said electrical detector means and said control means to reproduce in a three-dimensional form the data represented by said analogue means.

3. Apparatus for providing a record of three-dimensional information for use in controlling associated equipment in the reproduction of a three-dimensional object comprising, two dimension analogue means having selected sets of spatial data related to three dimensions depicted at different points thereon, at least one of which dimensions is depicted by preselected electrical quantities, electrical detector means for sensing said electrical quantities and producing a varying signal output related to the quantities sensed and reproducing means including means operatively controlled in its movement in at least one dimension by the varying signal output of said electrical detector means to reproduce the three-dimensional data represented by said analogue means.

4. Apparatus for producing three-dimensional forms from a mass comprising analogue means having selected spatial data depicted by preselected values of electrical quantities at different points on a linear surface having a first and second dimension, different electrical values representing different values of data of a third dimension, electrical detector means for sensing said electrical quantities, the signal output of said electrical detector means being responsive to the different values of said electrical quantities sensed thereby, and reproducing means including sculpturing means operatively controlled in its movement in at least one dimension by the signal output of said electrical detector means to control said sculpturing means to reproduce from said mass the data represented by said analogue means in said three dimensions.

5. Apparatus for producing three-dimensional spatial forms in a mass comprising, an informational template having spatial data depicted thereon by electrical quantities, the magnitude of said spatial data being indicated by the value of said electrical quantities, signal detector means including electrical probe apparatus for traversing said template providing signals related to the value of the different electrical quantities it senses on said template, a three-dimensional blank from which to produce the desired spatial form, sculpturing means for carving said blank, and control means responsive to said signals for operatively controlling said sculpturing means in its movement in at least one dimension to carve said blank according to the data detected by said signal detector means.

6. An apparatus for producing three-dimensional spatial forms comprising an electrically energized informational template having two of three three-dimensional data depicted graphically and the third depicted with electrical quantities, the magnitude of said third dimensional data being indicated by the values of the electrical quantities, probe means reactive to variations in said quantities for detecting the data represented thereby, means for moving said probe means relative to said template in a predetermined pattern to detect the data at the different points thereon, and means responsively synchronized to movements of said probe means and the data detected thereby for reproducing said data in three-dimensional relation.

7. In an apparatus for producing spatial forms from a mass, a template presenting three-dimensional spatial data comprising a plurality of spaced electrical conductors formed in data pattern on the template, the planar dimensions of said pattern depicting first and second spatial dimensions, material of preselected electrical characteristics interconnecting said conductors, and means for electrically energizing said conductors each with a preselected electrical quantity of constant value representing a third spatial dimension, the differntial between such constant electrical quantities determining a corresponding differential between data in said third spatial dimension and providing an interpolative medium for determining the values of said third spatial dimension existing at any selected point intermediate selected conductors.

8. A pattern for the production of three-dimensional relief maps and like spatial forms, comprising, an electrically conductive template having a pattern of separated electrical conductors thereon, each conductor representing a trace of first spatial dimensions having a like value with respect to a reference plane, third and second spatial dimensions of said plane being proportionally depicted by the planar dimensions of said pattern, resistance means intermediate said conductors, and means for energizing each of said conductors with an electrical quantity of preselected value proportional to the value of the first spatial dimension represented thereby, the said resistance means providing interpolative values of said first spatial dimension intermediate said conductors.

9. The process of producing a thre-dimensional relief mold from graphical data depicted on a two-dimensional contour map having elevational contour lines, comprising the steps of, reproducing the pattern of the elevational contour lines as a plurality of electrically conductive members on a template, coupling the electrically conductive members with a resistance material of predetermined value, energizing said electrically conductive members with electrical quantities selected correspond with the elevational data on the contour map, methodically sensing the electrical quantities depicted by said conductive members and intermediate resistance material to define a pattern, and driving a sculpturing apparatus through a mass and to varying depths according to said pattern and the values of the sensed electrical quantities to reproduce the spatial data of said template in three-dimensional form in said mass.

10. A process for producing three-dimensional forms from graphical data depicted on a planar surface in which two dimensions of the form are related to corresponding dimensions of said surface and the third dimension thereof is depicted by the application of different voltages to said surface, comprising the steps of, scanning said surface by moving a probe means electrically responsive to said different voltages thereover to provide variations of electrical response related to variations of said voltages, and driving a form cutting device against a carving blank and to varying depths in synchronism with the movements of said probe means over said surface and according to its electrical response to said different voltages.

11. Apparatus for producing three-dimensional forms comprising analogue means having selected spatial data in which one dimension thereof is depicted by preselected electrical quantities at different points thereon, electrical detector means for sensing said electrical quantities at said different points, reproducing means including sculpturing means for reproducing from a mass in a three-dimensional form the data represented by said analogue means, means for moving said electrical detector means to a given point on said analogue means for moving said sculpturing means relative to a related point on said mass; and control circuit means operative to adjust the position of said sculpturing means relative to said mass at said related point by a value related to the mentioned one dimension of the data sensed by said electrical detector means at said given point.

12. Apparatus for producing three-dimensional forms comprising analogue means having selected spatial data in which one of three dimensions is depicted by preselected electrical quantities thereon, electrical detector means for sensing said electrical quantities at different points on said analogue means, reproducing means including sculpturing means for reproducing from a mass in a three-dimensional form the data represented by said analogue means, means for moving said sculpturing means relative to said mass and said detector means relative to said analogue means in a related manner, control circuit means comprising indicating means for providing a signal indicative of the depth of the cut of the sculpturing means relative to said mass, comparison means for comparing the indicated position signal with the data depicting signal sensed by said electrical detector means as moved to the related point on said analogue means, and position adjusting means operatively responsive to a resultant differential signal in the value of the indicated signal and the depicted signal to adjust said sculpturing means to the depth depicted on said analogue means, whereby said indicator means are adjusted to provide an indicated position signal of a predetermined value relative to said data depicting signal which terminates further adjustment of the sculpturing means.

13. In an apparatus for producing three-dimensional forms from analogue means having selected spatial data in which one of three dimension is depicted by preselected electrical quantities at different points thereon, electrical detector means for sensing said electrical qualities, sculpturing means, control means operative to adjust the depth of cut of said sculpturing means relative to a mass by a value related to the data sensed by said electrical detector means at a relative point on said analogue means including a position indicating means for providing a reference signal indicative of the cutting depth of the sculpturing means relative to said mass, and signal generator means operatively controlled by the output signals of said detector means and said position indicating means to provide a control signal of a phase characteristic which indicates the direction of the adjustment required and of an amplitude which indicates the distance of the adjustment required to conform to the data on said analogue means.

14. An apparatus as set forth in claim 13 in which said control means includes a reversible drive motor, a phase responsive circuit for controlling the direction of rotation of said motor in accordance with the phase of said control signal, and link means operatively controlled by said motor to control the output of said position indicating means.

15. Apparatus for use in producing three-dimensional spatial forms in a mass comprising a two-dimensional template presenting three-dimensional spatial data, said template including a plurality of spaced electrical conductors formed in data pattern on the template, the planar dimensions of said pattern depicting first and second spatial dimensions, material of preselected electrical characteristics interconnecting said conductors, and means for electrically energizing said conductors each with a preselected electrical quantity of constant value representing a third spatial dimension, the differential between such constant electrical quantities determining a corresponding differential between data in said third spatial dimension and providing an interpolative medium for determining the values of said third spatial dimension existing at any selected point intermediate selected conductors, electrical scanning means adapted to be moved across said template in a regular predetermined pattern, said scanning means including probe means sensitive to the differential between the constant electrical quantities with which the conductors of the template are energized, said scanning means having a signal output varying in accordance with the differential the probe means senses in said scanning of the template, and reproducing means connected for simultaneous movement in said regular predetermined pattern and operatively controlled in its movement in at least one dimension by the signal output of said scanning means to reproduce the three dimensional data presented by said template.

16. Apparatus for use in producing three-dimensional spatial forms from a mass comprising: a two-dimensional planar template presenting three-dimensional spatial data, the planar dimensions of said template depicting first and second spatial dimensions, a plurality of spaced electrical conductors formed in a data pattern on said template, and material of preselected electrical conductivity interposed between said conductors; means for energizing said conductors each with a preselected different voltage of constant value representing an elevation value in a third spatial dimension, the voltage differences between such constant electrical voltages determining corresponding elevation differences between data in said third spatial dimension whereby said material provides an interpolative medium for determining the elevation in said third spatial dimension at any point intermediate said conductors; scanning means including a voltage-sensitive probe for providing an electrical output signal related to the voltage sensed at a given point and thus related to the elevation value at said given point; reproducing means coupled to said scanning means including sculpturing means for cutting material from said mass in the reproduction of said three-dimensional form; and drive means for displacing said scanning means over said planar template in a regular pattern and for simultaneously displacing said sculpturing means over said mass in said regular pattern as the height of said sculpturing means is operatively controlled by said electrical output signal of the scanning means.

17. Apparatus for use in producing a three-dimensional spatial form comprising a two-dimensional planar template presenting three-dimensional spatial data, the planar dimensions of said template depicting first and second spatial dimensions, the third spatial dimension being depicted by an electrical quantity, and the magnitude of the third spatial dimension being indicated by the value of the electrical quantity, scanning means for traversing said template capable of distinguishing between different values of said electrical quantity, sculpturing means coupled to said scanning means for cutting material from a mass in the reproduction of said three-dimensional form, and drive means for displacing said scanning means over said planar template in a regular pattern and for simultaneously displacing said sculpturing means over said mass in said regular pattern, the height of said sculpturing means being operatively controlled by the scanning means in accordance with the values of the electrical quantity which the scanning means senses.

References Cited in the file of this patent
UNITED STATES PATENTS

| | | |
|---|---|---|
| 1,787,761 | Pomplum et al. | Jan. 6, 1931 |
| 1,907,250 | Shaver | May 2, 1933 |
| 2,336,705 | Stewart | Dec. 14, 1943 |
| 2,452,664 | Koenig | Nov. 2, 1948 |
| 2,569,817 | Wolf et al. | Oct. 2, 1951 |
| 2,622,871 | Martin | Dec. 23, 1952 |
| 2,677,310 | Campbell | May 4, 1954 |
| 2,702,496 | Davis et al. | Feb. 22, 1955 |
| 2,733,005 | Sherborne et al. | Jan. 31, 1956 |
| 2,852,189 | Becker et al. | Sept. 16, 1958 |
| 2,858,978 | Yetter | Nov. 4, 1958 |
| 2,876,562 | Stieber | Mar. 10, 1959 |

FOREIGN PATENTS

| | | |
|---|---|---|
| 1,111,229 | France | Oct. 26, 1955 |